Patented Dec. 2, 1952

2,620,339

UNITED STATES PATENT OFFICE 2,620,339

PREPARATION OF POLYMETHINE DYESTUFFS

Jacob Joseph Jennen, Antwerp, Belgium, assignor to Gevaert Photo-Producten N. V., Mortsel-Antwerp, Belgium, a company of Belgium No Drawing. Application August 4, 1947, Serial No. 766,097. In Germany May 22, 1941

Section 1, Public Law 690, August 8, 1946
Patent expires May 22, 1961

6 Claims. (Cl. 260—240.1)

This invention relates to a process for preparing polymethine dyestuffs in which one or more groups of two carbon atoms of the polymethine chain are linked together by means of an outward bridge in the manner as to form one or more closed rings.

As already known, keto-hydroxytrimethine dyestuffs according to the following general formula:

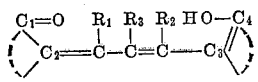

may be obtained by reacting cyclic compounds containing a reactive methylene group adjacent to a CO group either on 1,3 diketones or on 1,3 ketone aldehydes of the following general composition:

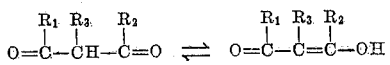

It is an object of the present invention to provide a process for the preparation of new polymethine dyestuffs.

Another object of my invention is to provide new polymethine dyestuffs.

Further objects will appear from the following description.

I have found that exquisite dyestuffs of the following composition may be produced

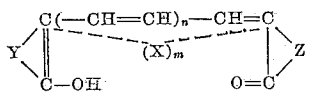

wherein $n$ and $m$ are 1 or 2, $n$ being at least equal to $m$, Y and Z are non-metallic atoms necessary to complete a carbocyclic or heterocyclic ring wherein occasionally one or more groups of two atoms are shared by an additive ring, X is the non-metallic atoms necessary to complete a carbocyclic or heterocyclic ring having occasionally a fused-on arylene group with any two carbon atoms of the polymethine chain, and X, Y and Z may constitute either identical or different rings.

As $n$ is 1 or 2, the above formula represents, respectively, trimethine and pentamethine dyestuffs.

In this general formula, the atoms X of the bridge may either be composed but of carbon atoms, $n$ being at least equal to $m$, as e. g. in butylene, ortho-phenylene and benzoylene

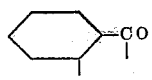

or may contain a N atom, as e. g. in aza-o-phenylene

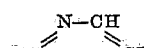

or more N atoms, as e. g. in 3'-4'-pyrazolo

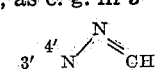

or O-atoms either alone or together with other hetero atoms, as e. g. in the isoxazole nucleus

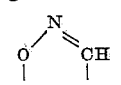

The remaining H atoms of the polymethine chain may be substituted by alkyl, aryl, aralkyl, acyl, carboxyethyl and others as, for instance, acetyl, para-iodophenyl and pyridyl-2.

The hydrogen of the enol group evidently may be replaced by metals, as Na, K, Ca, Ag or organic radicals, e. g., triethylammonium, acetyl, etc.

To carry out my new process, compounds of the following general formula, hereinafter called "intermediate products," are condensed in molecular proportion with carbocyclic or heterocyclic five or six membered compounds having occasionally a fused-on arylene group and containing a reactive methylene group adjacent to a CO group

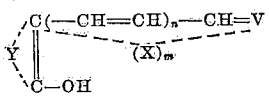

respectively

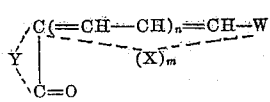

wherein $n$ and $m$ are 1 or 2, $n$ being at least equal to $m$, Y is the non-metallic atoms necessary to complete a carbocyclic or heterocyclic ring wherein optionally one or more groups of two atoms are shared by an additive ring, X is the non-metallic atoms necessary to complete a carbocyclic or heterocyclic ring having occasionally a fused-on arylene group with any two carbon atoms of the polymethine chain, Y and X may constitute either identical or different rings, V is O, =N-aryl or (—O-alkyl)₂, and W is —OH, —ONa, —O-alkyl, —O—CO-alkyl, —O—CO-aryl, halogen or a substituted amino group.

The condensation is carried out in the known manner by heating, suitably in the presence of diluents or condensing agents.

Appropriate intermediate products are, for instance: 4-4'-methenyl-bis-phenylmethylpyrazolone or its disulphonic acid, bi-indone, methenyl-bis-indandione, 1-phenyl-3-methyl-4-(3-oxo-2-phenylhydrindylidene)-pyrazolone-5 (Beilstein 24, Erg. 391); as bodies with a reactive methylene group may be named, e. g., indandione-1-3, 3-phenyl-5-isoxazolone, 3-methyl-5-pyrazolone, 1-phenyl-3-methyl-5-pyrazolone, 1-1'(diphenylene-4-4')bis(3-methyl-5-pyrazolone), barbituric acid, thiobarbituric acid, rhodanine, phenyl-rhodanine, pseudothiohydantoine as well as their derivatives or substitution products, especially their sulphonic acids.

Some specific examples of the method and products of my invention are given hereinafter.

*Example 1*

2 g. potassium hydroxide, 8 g. phenylmethylpyrazolone and 10 g. methenyl-bis-phenylmethylpyrazolone are successively dissolved in 250 cm.³ methyl alcohol. After 7 hours' heating on a water bath at 75–80° C., an intense magenta solution is formed. This solution is cooled, and the next day the obtained crystals having the form of bronze-colored fine needles are filtered under suction. The dyestuff may be considered as 1-phenyl-3-methyl-5-hydroxypyrazolyl-alpha' - beta - (3' - phenyl - 5' - methyl - 3' - 4' - pyrazolo) trimethine-1-phenyl-3-methyl-5-pyrazolone.

Absorption maximum: 5404 Å in methyl alcohol. The formula is as follows:

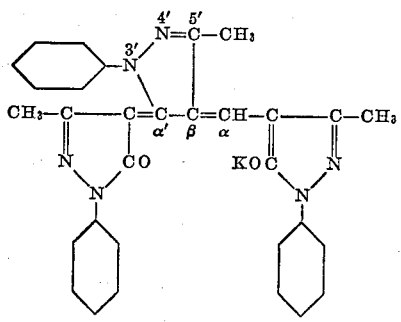

This magenta enol dyestuff may be converted into an orange-red ketone dyestuff. For this purpose, the methyl alcoholic solution is poured into diluted hydrochloric acid, and the precipitated dyestuff is filtered, washed and recrystallized from methyl alcohol. The result is an orange-red micro crystalline powder with a melting point at 175° C. The nitrogen percentage found is 16% (the calculated percentage for $C_{31}H_{26}O_2N_6$ is 16.3%).

*Example 2*

To obtain an analogous dyestuff containing a sulpho group, 0.01 mol 4-4'-methenyl-bis-phenylmethylpyrazolone, 0.01 mol sulphophenylmethyl-pyrazolone and 0.02 mol sodium hydroxide are heated in 30 cm.³ methyl alcohol on a water bath for 7–10 hours whereafter this solution is poured into 100 cm.³ ether. The finely divided dyestuff obtained is filtered under suction.

Absorption maximum: 530 mµ in water. The formula is as follows:

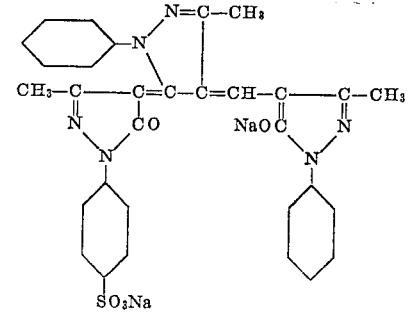

*Example 3*

2 g. of the enol dyestuff obtained according to Example 1 and 1 g. dry sodium acetate are heated in 6 cm.³ acetic acid anhydride on a water bath for one hour. After cooling, the reaction mixture is poured into water. The precipitated dyestuff is filtered under suction, dried and recrystallized from glacial acetic acid.

Absorption maximum: about 425 mµ in ethyl acetate. The formula is as follows:

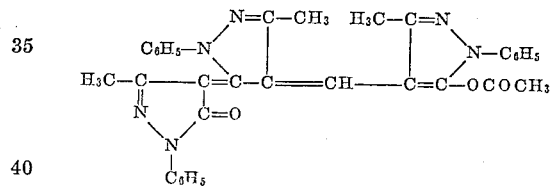

*Example 4*

0.01 mol 4-4'-methenyl-bis-phenylmethylpyrazolone-p-p'-disulphonic acid, 0.01 mol phenylmethylpyrazolone and 4 cm.³ concentrated aqueous ammonia are heated in 50 cm.³ methyl alcohol on the water bath for 7 hours whereafter the magenta dyestuff is precipitated by ether.

Absorption maximum: 530 mµ in water. This dyestuff is the ammonium salt of 1-sulphophenyl-3 - methyl - 5 - hydroxypyrazolyl - alpha' - beta - (3' - sulphophenyl - 5' - methylpyrazolo - 3' - 4') - trimethine - 1 - phenyl - 3 - methyl - 5-pyrazolone. The formula is as follows:

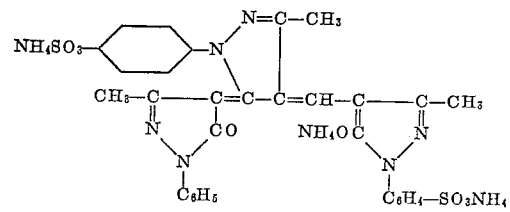

*Example 5*

The dyestuff of Example 4 may also be considered as an intermediate product because it respectively contains a reactive CO group and a CONH₄ group in the pyrazolone nucleus.

If at the preparation of the dyestuff of Example 4 0.05 mol sodium hydroxide are used instead of the aqueous ammonia, a pentamethine dyestuff is formed besides the trimethine dyestuff.

Absorption maximum: 625 mμ in water. The formula is as follows:

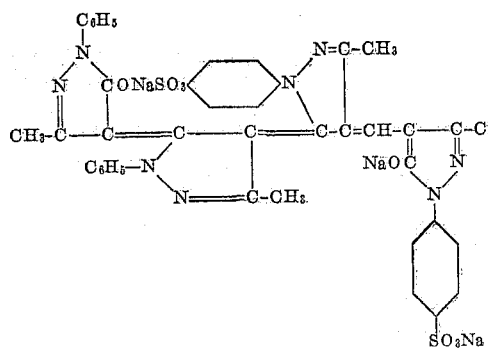

Instead of using these intermediate products as starting material, the preparation of both the intermediate product and dyestuff, especially when preparing a dyestuff with identical end rings, may be carried out in one step. For this purpose, 1 mol of a compound of the general formula:

$$Y(=CH-CH)_n=CH-W$$
$$\underbrace{\qquad\qquad}_{(X)_m}$$

wherein at least one group of two carbons as described above is linked together by a bridge, is condensed with 2 mols of a carbocyclic or heterocyclic five or six membered compound having occasionally a fused-on arylene group and containing a reactive methylene group adjacent to a CO group.

The following starting materials correspond to the above formula: hydroxymethylene-cyclopentanone, hydroxymethylene-cyclohexanone, 1-phenyl-3-methyl-4-anilidomethylene-5-pyrazolone, 2-hydroxythionaphthene-3-aldehyde, hydroxymethylene-camphor, hydroxymethylene-carbomethone, hydroxymethylene-carbone, hydroxymethylene-dihydroisophorone, 1-1-dimethylcyclohexane-3,5-dione, 3-hydroxyindone - 2 - carboxylic acid ethyl ester, benzotetronic acid, 1 - chlorocyclohexanone-3,1-benzoyloxy-3-oxo-2-phenyl-indene, derivatives of the homophtaldehyde, as o-formylstyryl-aminosulphonic acid (Berichte 64, 934) or the substituted glutaconic dialdehydes obtained by condensation of chlorosulphonic acid or 2,4-dinitrochlorobenzene with pyridine derivatives substituted by side rings, as for instance cinchomeronic anhydride cinchomeronimidine.

Example 6

0.04 mol phenylmethylpyrazolone-p-ammonium sulphonate and 0.02 mol sodium oxymethylene-cyclohexanone are heated in 60 cm.³ methyl alcohol on the water bath for 7 hours. Next 45 cm.³ of the alcohol are distilled off, then the dyestuff is filtered under suction and washed by means of ether. The dyestuff thus obtained is 1-phenyl-3-methyl-5- hydroxypyrazolyl - alpha'-beta-butylenetrimethine-1-phenyl - 3 - methyl-5-pyrazolone- 4'- 4''- di - ammonium sulphonate which is slightly soluble in water with an intensive magenta color.

Absorption maximum: about 530 mμ in water. The formula is as follows:

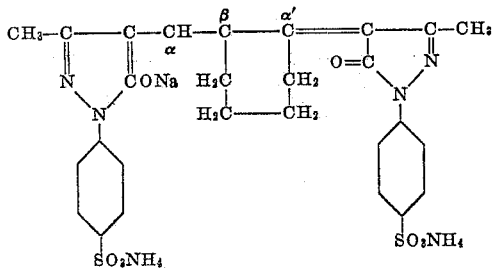

Example 7

When in Example 6 hydroxymethylene-camphor is used instead of hydroxymethylene-cyclohexanone, an alpha'-beta-camphanotrimethine dyestuff is obtained. The formula is as follows:

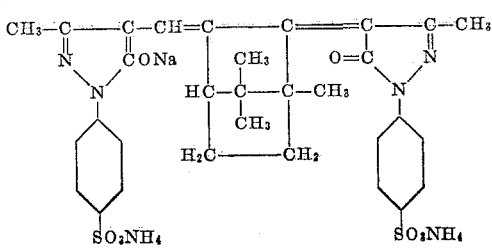

Example 8

0.02 mol phenylmethylpyrazolone, 0.01 mol 1-1-dimethylcyclohexane-3-5-dione and 1 cm.³ trimethylamine are heated in 50 cm.³ of methyl alcohol on the water bath for 24 hours whereafter the dyestuff is separated by pouring the intensive-magenta solution into a 10 per cent sodium chloride solution.

Absorption maximum: about 530 mμ in methyl alcohol. The formula is as follows:

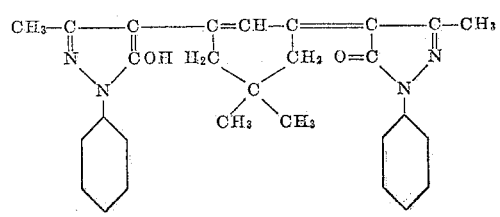

Example 9

Equal quantities of phenylmethylpyrazolone and sodium oxindone-sodium carboxylate are intensively mixed and heated for one hour on an oil bath at 135°–140° C. The intensive-green dyestuff obtained is repeatedly boiled with benzene. It hardly dissolves in water.

Absorption maximum: 680 mμ in methyl alcohol.

Whilst pouring a methyl alcoholic solution of this green sodium salt into diluted hydrochloric acid, the dyestuff acid, which may be recrystallized from methyl alcohol and has the form of a black powder, is separated. The color of the solution in alcohol is dark-violet. The nitrogen percentage found is 11.62% (the calculated percentage for $C_{30}H_{22}O_4N_4$ is 11.15%).

This dyestuff may be considered as 1-phenyl-3 - methyl - 5 - hydroxypyrazolyl - alpha - alpha'- orthophenylenetrimethine - beta - carboxylicacid-1-phenyl-3-methyl-5-pyrazolone. The formula is as follows:

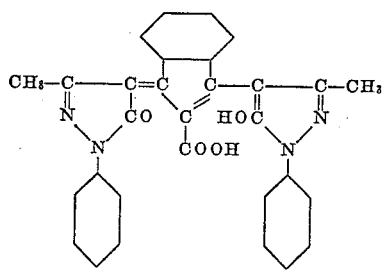

Example 10

0.01 mol sodium oxindone-sodium carboxylate and 0.01 mol phenylmethylpyrazolone-p-sodium sulphonate are dissolved in 60 cm.³ warm water. From this solution quickly turning to dark-red a finely divided dyestuff soluble in water, of magenta color precipitates whilst cooling. This dyestuff is to be regarded as 1-sulphophenyl-3-methyl - 4 - (3' - oxohydrindylidene)-5-pyrazolone-2'-sodium carboxylate. The formula is as follows:

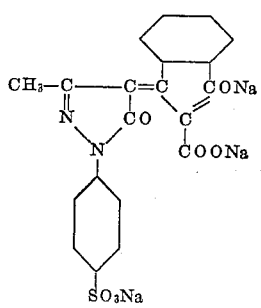

The solution of this intermediate product when heated on with 0.01 mol phenylmethylpyrazolone sodium sulphonate turns successively to black and dark-green. The new dyestuff is salted out by means of sodium chloride, filtered under suction and washed with a 20 per cent sodium chloride solution until the filtrate runs down clearly. It may be considered as the ortho-phenylene-trimethine dyestuff of Example 9 containing, however, two sulpho groups. Absorption maximum: 680 m$\mu$ in water.

Finally, when preparing dyestuffs wherein all the rings are identical, one mol of a compound of the general formula: W=CH—V wherein the hydrogen may be substituted as usual, for instance, diphenyl - formamidine, ortho - formic-acid ethyl ester or diphenyl acetamidine, may be used as starting material and condensed with three or more mols of five or six membered compounds having occasionally a fused-on arylene group and containing a reactive methylene group adjacent to a CO group.

In this last way of carrying out my new process, a product may be used which splits off the compound V=CH—W, for instance, antipyrine aldehyde, 2 - hydroxynaphtyl - 1 - aldehyde, alpha-methyl-indole-beta-aldehyde (compare "Zentralblatt C 1940 II2302").

The compound V=CH—W, no longer containing a ring system, shall be condensed with three mols of the reactive compound. In this condensation, the three mols react successively whilst gradually forming both the aforesaid starting materials and the intermediate products. When condensing, for instance, diphenylformamide with 1 mol phenylmethylpyrazolone, the starting material anilidomethylene-phenylmethylpyrazolone is produced. In the presence of solvents, the said starting material condenses with another mol phenylmethylpyrazolone to the intermediate product methenyl - bis - phenylmethylpyrazolone of Example 1.

Example 11

The dyestuff of Example 1 may be obtained directly by means of diphenyl-formamidine. 0.03 mol phenylmethyl-pyrazolone, 0.01 mol diphenyl-formamidine and 0.01 mol potassium hydroxide are heated in 60 cm.³ ethyl alcohol on the water bath for three hours. After cooling, the crystallized dyestuff is filtered under suction and washed by means of ether. In case of using a mixture of 30 cm.³ ether and 30 cm.³ ethyl alcohol instead of 60 cm.³ ethyl alcohol, the reaction runs until the formation of the intermediate products which can be isolated.

Example 12

0.03 mol phenylisoxazolone, 0.01 mol diphenyl-formamidine and 0.01 mol potassium hydroxide are heated in 40 cm.³ methyl alcohol on the water bath for seven hours. Next the filtered solution is poured into 200 cm.³ of a 20 per cent potassium chloride solution, and the precipitated dyestuff is filtered under suction.

Absorption maximum: 525 m$\mu$ in methyl alcohol. The formula is as follows:

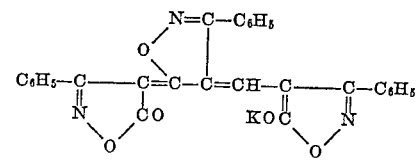

Dyestuffs obtainable according to this process directly dye animal fibres in a neutral bath.

It is believed that the general method and the specific examples of my invention, as well as the advantages thereof, will be apparent from the foregoing detailed description. It will also be apparent that while I have shown and described preferred examples of my invention, changes may be made without departing from the spirit of the invention, as sought to be defined in the following claims.

I claim:

1. A dyestuff selected from the group consisting of three members of the following formulae:

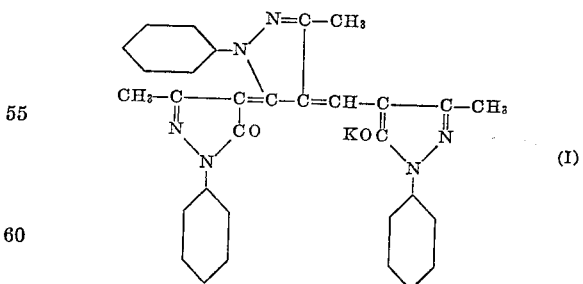

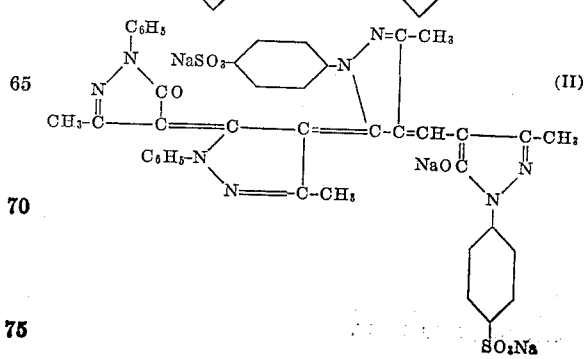

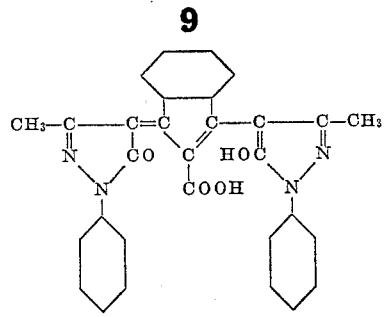

(III)

2. A symmetrical dyestuff according to the following formula:

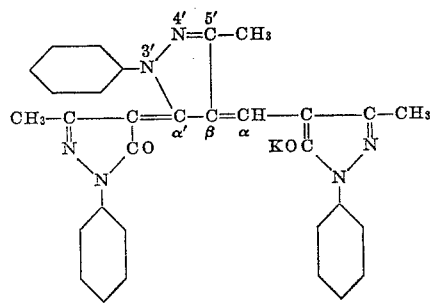

3. A symmetrical dyestuff according to the following formula:

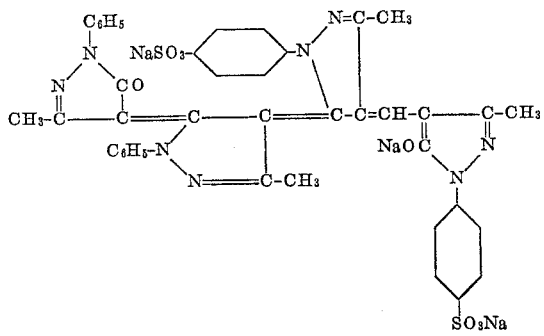

4. A symmetrical dyestuff of the following formula:

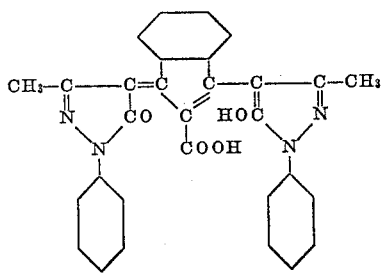

5. Process for obtaining the dyestuff of the following formula:

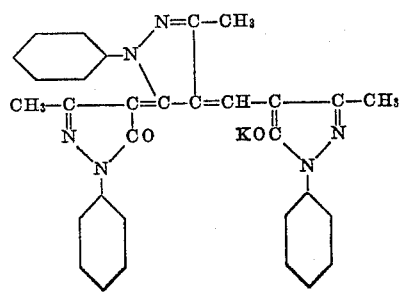

comprising heating in equimolar proportions in an alkaline alcoholic solution

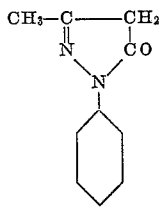

and

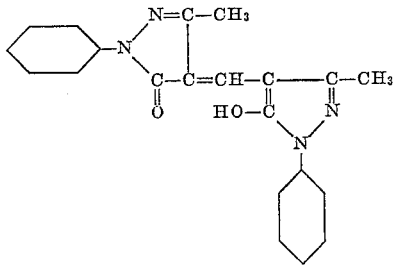

6. Process for obtaining the dyestuff of the following formula:

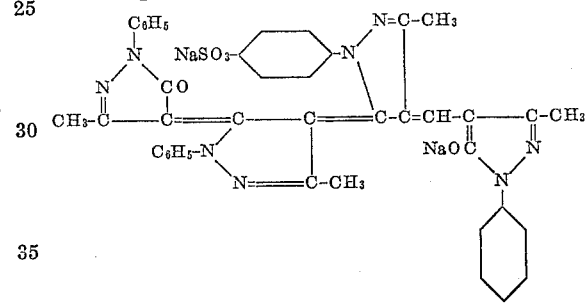

comprising heating in equimolar proportions in the presence of NaOH

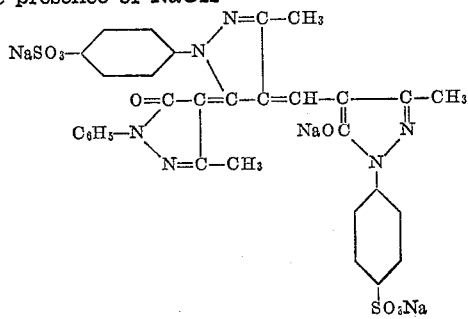

and

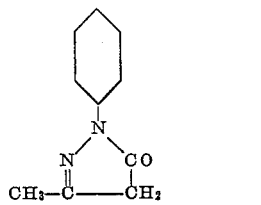

JACOB JOSEPH JENNEN.

REFERENCES CITED

The following references are of record in the file of this patent:

UNITED STATES PATENTS

| Number | Name | Date |
|---|---|---|
| 2,013,181 | Kracker et al. | Sept. 3, 1935 |
| 2,220,123 | Schivarc | Nov. 5, 1940 |
| 2,265,909 | Kendall | Dec. 9, 1941 |
| 2,274,782 | Gaspar | Mar. 3, 1942 |
| 2,294,909 | Jennings | Sept. 8, 1942 |